Figure 1:
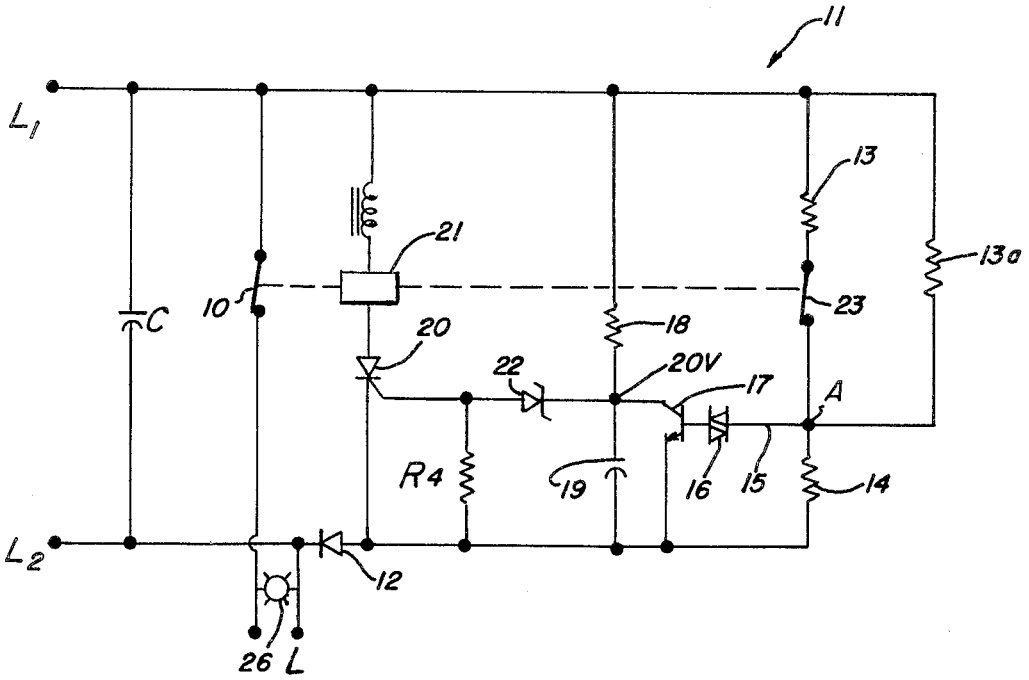

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 7, 1976

950 O.G. 7

T950,010
LOW VOLTAGE PROTECTOR
Stephen J. Hogan, Coloma, and Donald R. Vander Molen, Stevensville, Mich., assignors to Whirlpool Corporation
Filed Sept. 8, 1975, Ser. No. 611,509
Int. Cl.[2] H02H *3/24*
U.S. Cl. 317—31
1 Sheet Drawing. 9 Pages Specification

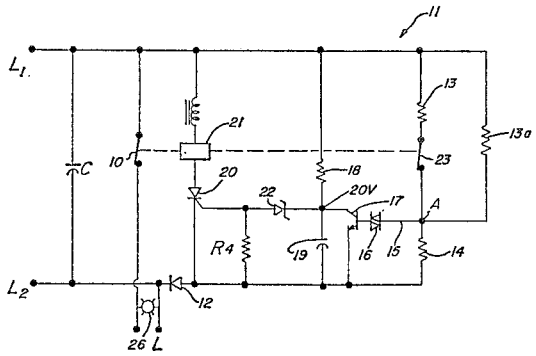

Electrical apparatus for preventing damage to electrical equipment as a result of a low voltage condition. The apparatus includes circuitry requiring that the voltage rise to above the dropout voltage before re-energizing the electrical equipment. The control apparatus may be provided as an integral part of the electrical equipment or may be provided as a separate device as desired. An indicator may be associated with the apparatus to indicate disconnection of the equipment because of the low voltage condition. The apparatus may further be arranged to provide a time delay in reconnection of the equipment.

LOW VOLTAGE PROTECTOR

Original Filed Sept. 8, 1975